US 11,775,667 B2

(12) United States Patent
Luciani, Jr.

(10) Patent No.: US 11,775,667 B2
(45) Date of Patent: Oct. 3, 2023

(54) VIRTUALIZING SECURE STORAGE OF A BASEBOARD MANAGEMENT CONTROLLER TO A HOST COMPUTING DEVICE

(71) Applicant: Hewlett Packard Enterprise Development LP, Houston, TX (US)

(72) Inventor: Luis Enrique Luciani, Jr., Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 328 days.

(21) Appl. No.: 17/089,201

(22) Filed: Nov. 4, 2020

(65) Prior Publication Data
US 2022/0138336 A1 May 5, 2022

(51) Int. Cl.
*G06F 21/62* (2013.01)
*G06F 16/14* (2019.01)

(52) U.S. Cl.
CPC ........ *G06F 21/6218* (2013.01); *G06F 16/152* (2019.01)

(58) Field of Classification Search
CPC .... G06F 21/6218; G06F 21/64; G06F 21/566; G06F 21/577; G06F 16/152; G06F 8/65; G06F 8/71; G06F 9/45558
See application file for complete search history.

(56) References Cited

U.S. PATENT DOCUMENTS

| | | | |
|---|---|---|---|
| 9,087,189 B1 * | 7/2015 | Koeten | .................. H04L 41/28 |
| 9,806,959 B2 * | 10/2017 | Christopher | .......... G06F 13/105 |
| 10,282,549 B2 | 5/2019 | Cisneros et al. | |
| 11,153,160 B1 * | 10/2021 | Davis | .................. H04L 41/0816 |
| 11,334,817 B2 | 5/2022 | Wang et al. | |
| 2010/0031360 A1 | 2/2010 | Seshadri et al. | |
| 2014/0280756 A1 * | 9/2014 | Maity | ................... H04L 67/131 |
| | | | 709/219 |
| 2015/0220455 A1 | 8/2015 | Chen et al. | |

(Continued)

FOREIGN PATENT DOCUMENTS

| | | |
|---|---|---|
| CN | 105160258 A | 12/2015 |
| CN | 110472745 A | 11/2019 |
| CN | 110490330 A | 11/2019 |

OTHER PUBLICATIONS

Cisco, "Firepower Management Center Configuration Guide, Version 6.2.3," Apr. 16, 2020, pp. 1-25, Retrieved from the Internet on May 27, 2020 at URL: <cisco.com/c/en/us/td/docs/security/firepower/623/configuration/guide/fpmc-config-guide-v623/using_host_profiles.html>.

(Continued)

*Primary Examiner* — Han Yang
(74) *Attorney, Agent, or Firm* — Trop, Pruner & Hu, P.C.

(57) ABSTRACT

Example implementations relate a system and method for storing configuration files of a host computing device in a secure storage of a Baseboard Management Controller (BMC). The secure storage includes configuration files associated with the host computing device. The BMC is communicatively connected to the host computing device using a communication link. The secure storage is emulated as a storage device to the host computing device. The BMC monitors the secure storage to detect changes in the configuration files. When there is a change in a configuration file, the BMC performs a security action in the host computing device.

20 Claims, 4 Drawing Sheets

(56) References Cited

U.S. PATENT DOCUMENTS

| | | |
|---|---|---|
| 2015/0324690 A1 | 11/2015 | Chilimbi et al. |
| 2015/0331694 A1* | 11/2015 | Balakrishnan ............ G06F 9/44 713/2 |
| 2016/0162313 A1* | 6/2016 | Lemanski ............. H04L 63/123 718/1 |
| 2018/0217905 A1 | 8/2018 | Reza et al. |
| 2018/0247191 A1 | 8/2018 | Katz et al. |
| 2018/0331897 A1 | 11/2018 | Zhang et al. |
| 2019/0020629 A1 | 1/2019 | Baird, III et al. |
| 2019/0379656 A1 | 12/2019 | Gore et al. |
| 2020/0057920 A1 | 2/2020 | Collins et al. |
| 2020/0097657 A1 | 3/2020 | Jacquin et al. |
| 2020/0218940 A1 | 7/2020 | Anglin et al. |
| 2020/0412558 A1* | 12/2020 | Ballard ............... H04L 12/4633 |
| 2021/0134095 A1 | 5/2021 | Milt et al. |
| 2021/0240857 A1* | 8/2021 | Bandi .................... G06F 21/64 |

OTHER PUBLICATIONS

Syngress, "Chapter 10—Auditing and Security Incidents," Jul. 5, 2008, pp. 667-728.
Watanabe et al, "Blockchain contract: A complete consensus using blockchain", IEEE, 2015, 3 pages.
Yang et al., "Federated Machine Learning: Concept and Applications", ACM Trans. Intell. Syst. Technol., vol. 10, No. 2, Article 12, 2019, 19 pages.

\* cited by examiner

VIRTUALIZING SECURE STORAGE OF A BASEBOARD MANAGEMENT CONTROLLER TO A HOST COMPUTING DEVICE

BACKGROUND

Service providers and manufacturers are challenged to deliver quality and value to customers, for example by providing secure computing devices. A data center is a facility used to house computer networks, computer systems, and associated components, such as telecommunications and storage systems. Equipment in a data center may be in the form of servers mounted in rack cabinets. Data centers can be the target of malware attacks.

BRIEF DESCRIPTION OF THE DRAWINGS

Various examples will be described below with reference to the following figures.

Throughout the drawings, identical reference numbers may designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing examples only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Figure 3:
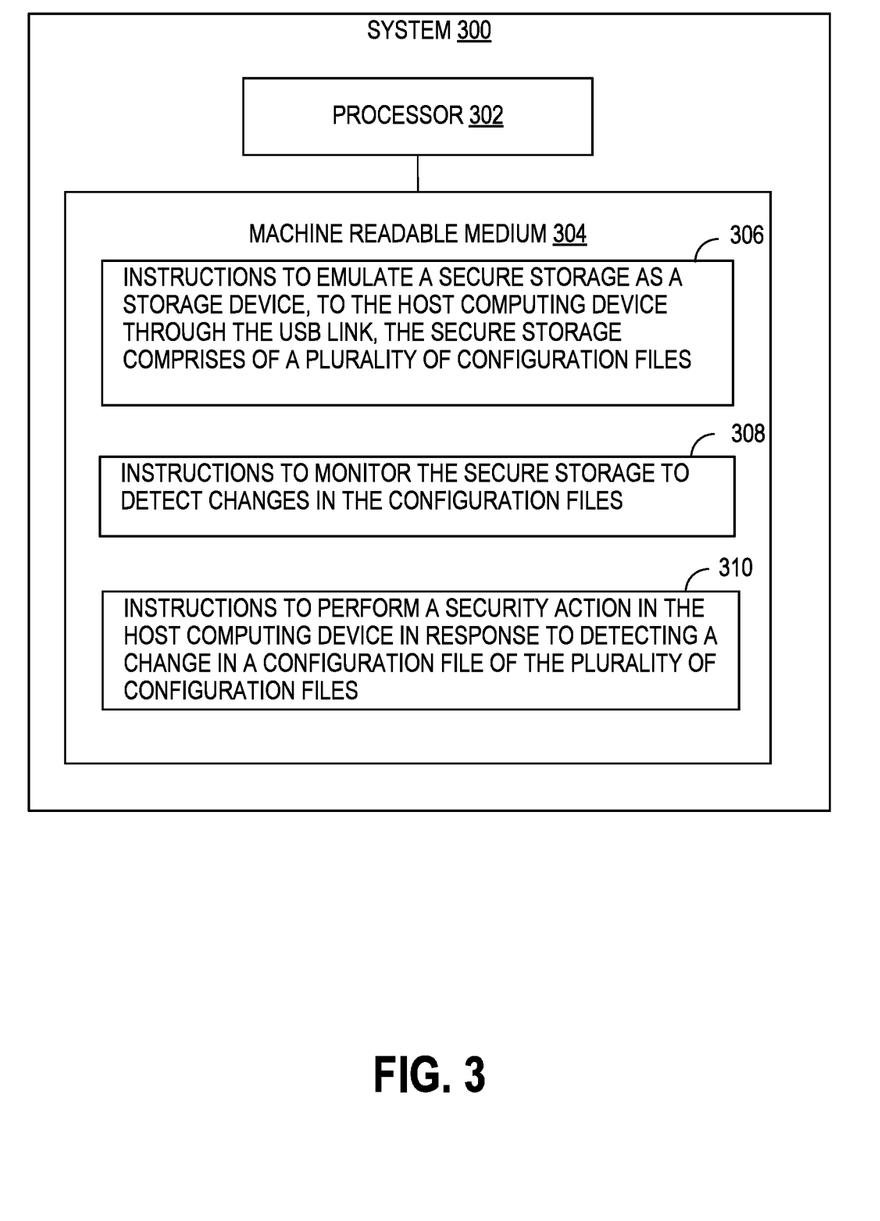
FIG. 3 is a block diagram of a system depicting a BMC having a processor operably coupled to a machine readable medium storing executable program instructions, in accordance with embodiments of the present disclosure.
Figure 4:
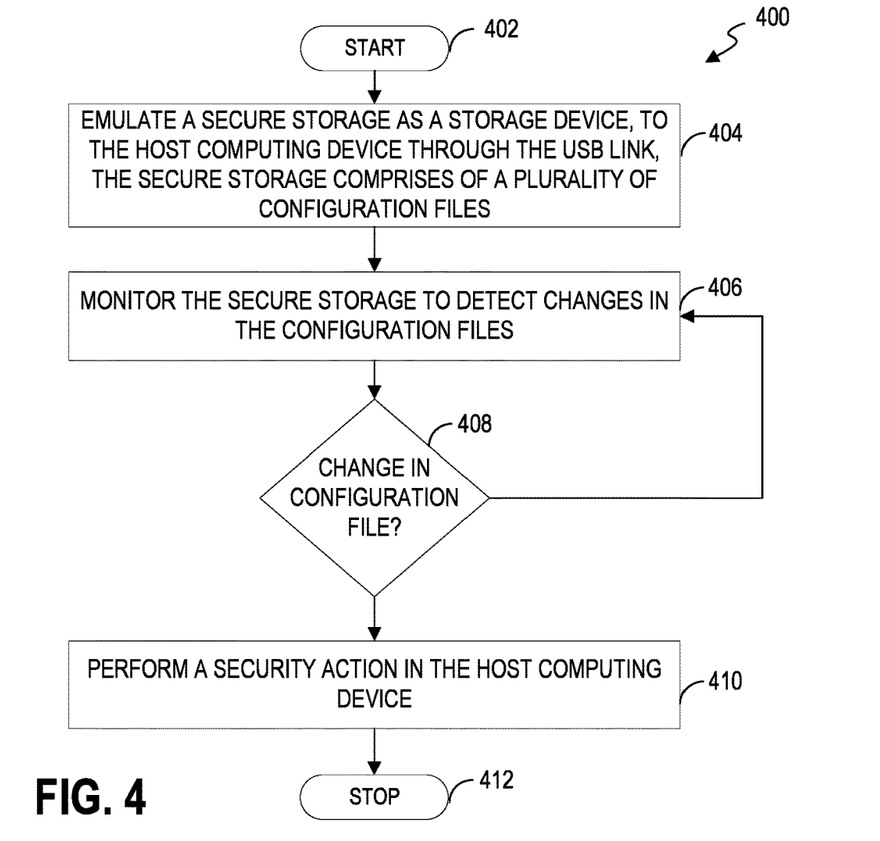
FIG. 4 is an example flow diagram depicting a method of virtualizing a secure storage of the BMC to the host computing device, in accordance with embodiments of the present disclosure.
Figure 5:
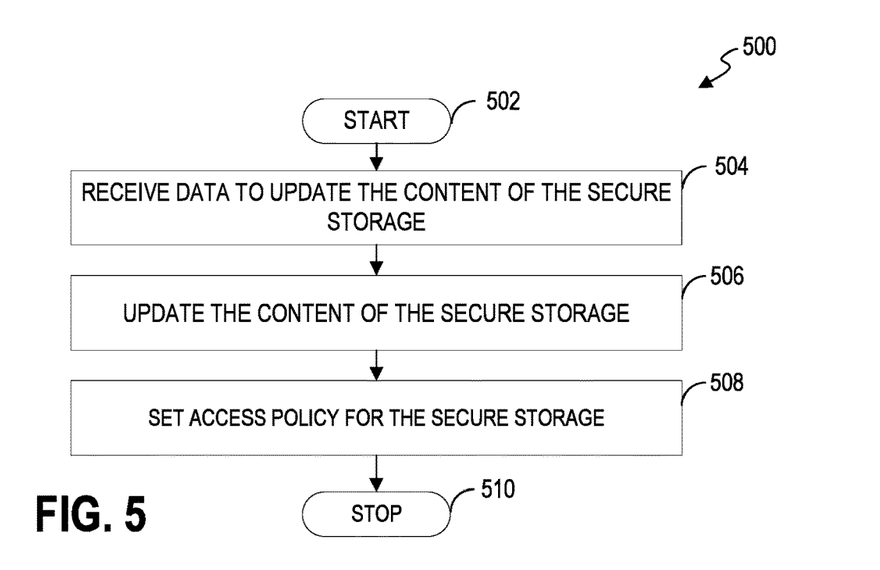
FIG. 5 is a flow diagram depicting a method of updating the secure storage in the BMC, in accordance with embodiments of the present disclosure.

For purposes of explanation of the present disclosure, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 4-5 is an example and is not intended to be limiting. Additional or fewer operations or combinations of operations may be used or may vary without departing from the scope of the disclosed examples. Thus, the present disclosure merely sets forth examples of implementations, and many variations and modifications may be made to the described examples. Such modifications and variations are intended to be included within the scope of this disclosure and protected by the following claims.

As an alternate to virtualization, application containerization is a rapidly developing technology that allows faster, secure and easier deployments of applications, in computing devices. Containerization bundles the application code together with the related configuration files, libraries, and dependencies required for it to run in an executable package called application containers. In addition, a single computing device may support multiple application containers with multiple configurations. These executable packages in the form of files generally reside in the storage device of the computing device. In addition the computing device includes several configuration files that define parameters, options, settings and preferences applied to operating systems (OS), infrastructure devices and applications.

However, security vulnerabilities originating due to unrestricted/unauthorized access to the computing device, may result in tampering of the files including configuration files. Hackers may introduce malware and arbitrary instructions to be executed by modifying the configuration files. If the access credentials of the computing device are hacked, there is a high chance that configuration files present in the storage device of the computing device may be accessed and modified. Thus, it is important to protect the files with sensitive data (e.g. configuration files) from unauthorized changes and identify a secure storage for the configuration files of the computing device.

To ensure that the secure storage is protected, the secure storage may be a remote drive or a storage in Random Access Memory (RAM) which is not accessible when the OS of the computing device loads. The secure storage may be accessible to authenticated users via the Baseboard Management Controller (BMC). As the secure storage is not available after boot, any malware on the computing device may not reach the secure storage. The secure storage remains protected even when the host computing device is compromised.

Accordingly, various examples disclosed herein relate to storing configuration files of a host computing device in the secure storage of the BMC. The secure storage includes configuration files associated with the host computing device. The BMC is communicatively connected to the host computing device using a communication link or a bus such as a Universal Serial Bus (USB) link. The secure storage is emulated as a storage device to the host computing device. The BMC monitors the secure storage to detect changes in the configuration files. When there is a change in one of the configuration files, the BMC performs a security action in the host computing device.

A baseboard management controller (BMC) is a microcontroller that can be used to monitor the health and operation of a computer. The BMC can monitor health-related aspects associated with the computer such as the temperature of components within the computer, the speed of rotational components (e.g., spindle motor, CPU fan, etc.) within the system, the voltage across or applied to one or more components within the system, and the available or used capacity of memory devices within the system.

The BMC may include management capabilities for subsystems of the computing device and is a separate from a processor that executes a main operating system of the computing device (e.g., a server or set of servers). The BMC may enable lights-out management of the computing device, which provides remote management access (e.g., system console access) regardless of whether the computing device is powered on, whether a primary network subsystem hardware is functioning, or whether an OS is operating or even installed.

Figure 1:
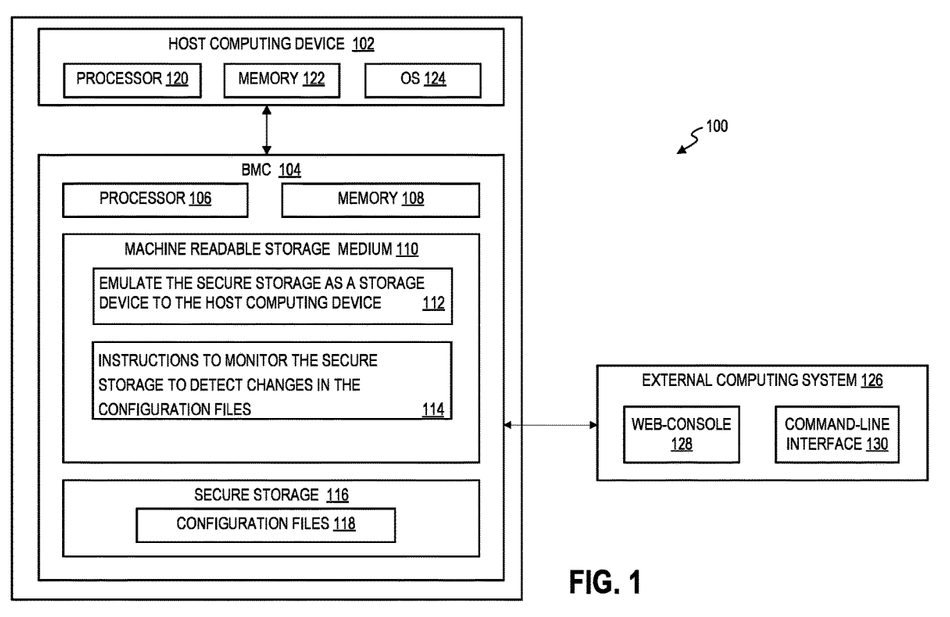
FIG. 1 is an example system, in accordance with embodiments of the present disclosure.

FIG. 1 is an exemplary system, in accordance with embodiments of the present disclosure. The host computing system 102 may include a handset, a smartphone, a tablet, a laptop, and/or another handheld or portable device. In some examples, the host computing system 102 may be a server deployed in a data center for hosting the workloads of the one or more customers. The data center may be implemented as an enterprise system, or a consumer system, or an industrial system that facilitates to execute or run the workloads for delivering intended service to end-users, and secure the workloads in parallel from one or more security vulnerabilities.

The host computing system 102 is operably connected to the external computing system 126 over a network (not shown). In such examples, the network may be a TCP/IP (Transmission Control Protocol/Internet Protocol) network, which is a suite of communication protocols used to interconnect network devices on internet.

The host computing system 102 is communicatively connected to a BMC 104 through a communication link. The host computing system 102 may include a processor 120, a memory 122, an operating system (OS) 124 and the BMC 104. The OS 124 may perform all the basic tasks like file management, memory management, process management, handling input and output, and controlling peripheral devices, such as disk drives, printers, and the like. The OS 124 is a collective management software application managing the operation of the host computing system 102. For example, the OS 124 can include a set of functional programs that control and manage operations of the devices connected to the host computing system 102. The set of application programs provide certain utility software for the user to manage the host computing system 102. In certain embodiments, the OS 124 is operable to multitask, i.e., execute computing tasks in multiple threads. Examples of the OS may be any of the commercial operating systems, such as Microsoft Windows, LINUX, UNIX, or any other operating systems.

The OS 124 may act as an intermediary between the hardware components and the one or more applications of the host computing system 102. In some implementations, processes in the OS 124 (e.g., update fetcher, verifier and installer) may be used to download, verify and install one or more configuration files associated with the applications.

The BMC 104 may be a service processor, which is capable of monitoring a current state of the host computing system 102 or other hardware devices with the help of one or more sensors. In some examples, the BMC 104 may be embedded within a main circuit board or a motherboard (not shown) of the host computing system 102 to be monitored. The BMC 104 may also be powered by an auxiliary power rail (not shown), even when the host computing system 102 is switched-off. Thus, enabling the external computing system 126 to establish a secure connection with the BMC 104 any time, and maintain a continuous interaction with the BMC 104 through-out the life-cycle of the host computing system 102.

Further, the BMC 104 may have its own memory 108 and processor 106 coupled to the memory 108, and may execute one or more program instructions stored in the memory to monitor the host computing system 102, regulate one or more infrastructure resources of the host computing system 102, and interact with the external computing system 126. Processor 106 may comprise a field programmable gate array (FPGA), application-specific integrated circuit (ASIC), microcontroller, central processing unit (CPU), logic, or any combination thereof.

The memory 108 can be a volatile memory, such as the random-access memory (RAM), for storing the data and information during the operation of the BMC 104. In certain embodiments, the memory 108 may be a volatile memory array.

The secure storage 116 of the BMC 104 stores configuration files 118 associated with the host operating system (OS) 124. The files 118 may be related to specific application containers present on the host computing system 102. In some use cases, the configuration files 118 that store sensitive data related to the applications being run on the operating system 126 of the host computing system 102 may be stored in the secure storage 116.

In an example, the secure storage may store data such as username and passwords associated with an application. In another example the secure storage may include configuration files with encryption keys, tokens, financial records. Any malware attack on these configuration files may expose the OS of the host computing system 102 to unauthorized access and result in leak of critical data.

In an example, the secure storage 116 may be present in the non-volatile RAM (NVRAM) of the BMC 104. The processor 106 is coupled to the secure storage 116.

The processor 106 is configured to control operations of the BMC 104. In certain embodiments, the processor 106 may be a central processing unit (CPU). The processor 106 can execute any computer executable code or instructions stored on the machine-readable medium 110. For example, the machine-readable medium 110 may include instructions 112 to emulate the secure storage as a storage device to the host computing system 102.

The processor 106 of the BMC 104 emulates the secure storage 116 as a storage device to the host computing system 102. In an example, the processor 106 may identify a type of the emulated mass storage device, thus indicating the type of the emulated mass storage device to be recognized as a storage device by the host computing system 102. In another example, the host computing system 102 may send a Small Computer System Interface (SCSI) command to the BMC 104 to detect a type of the emulated mass storage device. In response to the SCSI command, the processor 106 sends a response to the host computing system 102 to indicate the emulated mass storage device as a mass storage device. When the BMC 104 device is recognized as a mass storage device, the communication between the BMC 104 and host computing system 102 is through a communication link.

When the host computing system 102 recognizes the secure storage as a mass storage device, the host computing system 102 can request data from the secure storage 116.

In an embodiment, the access to configuration files 118 in the secure storage 116 of the BMC 104 may be controlled. For example, the BMC 104 may control access to the secure storage 116. The application placing the request for data may need to provide access credentials to retrieve the requested data. The security policy of the secure storage 116 may require authentication of the OS 124 before processing of the data request. In addition, the BMC 104 may control access to the secure storage 116 based on a current state of the OS 124.

The secure storage 116 may store data such as username and passwords associated with an application. In another example the secure storage may include configuration files with encryption keys, tokens, financial records. In some cases, the secure storage 116 comprises of configuration files 118 of the host computing system 102. For example, a complex application in the host computing system 102 may rely on configuration files stored in the secure storage 116 for UI settings, network parameters, storage parameters and other aspects that must be set up for operation.

The external computing system 126 may be accessed by an administrator (not shown) or by an authorized user (not shown) to regulate or manage the host computing system 102. It may be noted herein, that the administrator may be a representative of the data center. In the example system 100, the external computing system 126 is a server deployed in the data center. In some other examples, the external computing system 126 may be deployed outside the data center, without deviating from the scope of the present disclosure. The external computing system 126 may provide a graphical user interface (GUI) or a web-console 128 for the administrator to securely interact and manage the host computing system 102. In some other examples, the external computing system 126 may provide a command-line interface 130 for the administrator to interact and manage the host computing system 102.

During operation, on receiving a request for data from the secure storage 116, the BMC 104 may transfer the requested data to the host computing system 102.

The machine-readable medium 110 may include instructions 114 to monitor the secure storage to detect changes in the configuration files 118. The configuration files 118 in the secure storage 116 are monitored at periodic intervals to detect changes.

To ensure that there are no unauthorized changes to the configuration files 118, a current hash of each configuration file may be compared with a hash of the configuration file stored in the BMC 104. The BMC 104 may include a register with hash values of the configuration files 118. The hash values of the configuration files 118 are stored in a storage of the BMC 104 when the application containers are deployed for the first time in the host computing system 102. The current hash of a configuration file comprises of the file name and the contents of the file. In some cases the secure storage 116 may have configuration folder including all the files required by a specific container application. The current hash may include a hash of the file name and contents of configuration folder.

When the current hash of the configuration file matches the hash value stored in the BMC 104, it can be confirmed that there has been no changes to the configuration files 118 in the secure storage 116. In case the current hash of a configuration file does not match the corresponding hash stored in the register, there may be changes in the configuration files 118. This may indicate that the configuration files 118 in the secure storage 116 have been changed without authorization and the host computing device may have malware.

Using the external computing system 126, an administrator may securely login to the host computing system 102 and access the secure storage 116 of the BMC 104. The administrator may set a security policy to access the secure storage 116.

In an example, the security policy may set the secure storage 116 to have read-only access. The security policy to access the secure storage 116 is managed by the administrator using the external computing device 126 via out-of-band service of the BMC 104. Thus, if malware or a hacker obtains access to a user or administrator account, the malware or hacker still would not be able to change the configuration files.

In another example, the security policy includes access control rules. For example, a plurality of access control rules may be defined for accessing data from the secure storage 116. For example, access to BMC 104 and secure storage 116 may be based on FIPS validated 2-factor authentication.

Figure 2:
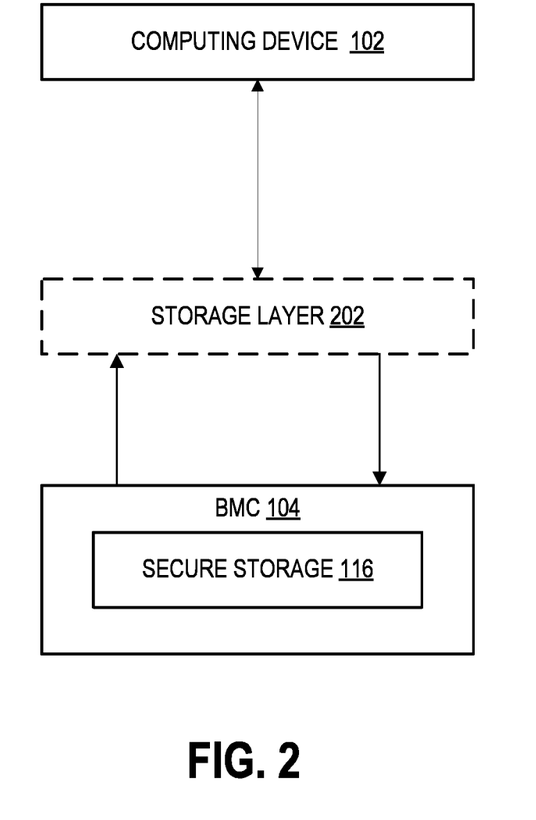
FIG. 2 depicts software emulation of the secure storage by the BMC according to certain embodiments of the present disclosure

FIG. 2 depict software emulation of the secure storage 116 by the BMC 104 according to certain embodiments of the present disclosure. For the BMC 104 to emulate the secure storage 116 as a storage device (for example, a USB drive), a storage layer 202 may be created. When the secure storage 116 is identified as a storage device (e.g. flash drive, USB flash drive, floppy drive, a hard drive device), the storage layer 202 is generated to indicate the type of storage device. The secure storage 116 is virtualized in the form of a drive such as a USB drive to the host computing system 102 and communication between the host computing system 102 and the BMC 104 is performed using an USB storage protocol. This virtualization allows configuration files 118 stored in the secure storage 116 to be accessed securely by the host computing system 102.

In addition, as the secure storage 116 is on BMC 104, any malware present on the host computing system 102 may not affect the secure storage 116 on the BMC 104. The secure storage 116 is a remote drive or a RAM drive within the BMC which is not accessible to the host computing device without authentication. The secure storage is accessible to authenticated users only via the BMC 104. As the secure storage 116 is not available to the OS after booting, the secure storage 116 may have limited exposure to any malware on the computing host system 102. Hence, the configuration files 118 present in the secure storage 116 are protected even when the OS 124 of the host computing system 102 is compromised FIG. 3 is a block diagram of a system 300 depicting a processor 302 and a machine readable medium 304 encoded with example instructions to access data present in the secure storage 116 on the BMC 104. The machine readable medium 304 is non-transitory and is alternatively referred to as a non-transitory machine readable medium. In some examples, the machine readable medium 304 may be accessed by the processor 302.

The machine readable medium 304 may be encoded with example instructions 306, 308, 310. The instruction 306, when executed by the processor 302, emulates the secure storage 116 as a storage device to the host computing system 102. The secure storage 116 is presented as a virtualized drive by the BMC 104 to the host computing system 102. The secure storage 116 includes configuration files related to applications stored in the host computing system 102.

The instruction 308, when executed may cause the processor 302 to monitor the secure storage to detect changes in the configuration files 118. The BMC checks the configuration files 118 on the secure storage 116 to detect changes in the configuration files 118.

For example, at periodic intervals a current hash of each configuration file may be compared with a hash of the corresponding configuration file stored in the BMC 104. The hash values of the configuration files 118 are stored in a storage of the BMC 104 when the application containers are deployed for the first time in the host computing system 102. The current hash of a configuration file comprises of the file name and the contents of the file. In some cases the secure storage 116 may have configuration folder including all the files required by a specific container application. The current hash may include a hash of the file name and contents of configuration folder.

During operation, when an update to a configuration file is required, the update may be performed via the external computing system 126 connected to the BMC 104. When an update is performed to the configuration files or files in a configuration folder, the stored hash value for the configuration file is updated in register of the BMC 104. The update of the stored hash value is ensures that latest version of the configuration files is used for comparison. More details related to updating configuration files 118 is described in conjunction with FIG. 5.

The instruction 308, when executed may cause the processor 302 to perform a security action in the host computing system 102 in response to detecting a change in a configuration file of the plurality of configuration files 118. When a change is detected in the configuration file 118, the BMC 104 monitoring the secure storage may assume that the OS of the host computing system 102 is compromised. A change is detected when a current hash of a configuration file does not match the corresponding hash of the configuration stored in the register of the BMC 104. This indicates that the configuration files 118 in the secure storage 116 may have been changed without authorization. The unauthorized modification of the configuration file indicates that the host computing system 102 may be compromised.

The security policy set for the access of the secure storage 118 may define the security action to be performed. In an example, the BMC 104 may report the change to a central management device in the data center along with log information from the BMC 104 and quarantine the host computing system 102. In some cases, the BMC 104 shut down the system and/or each interface to the system. In addition, access to the secure storage 116 may be locked until the host computing system 102 is investigated.

In some examples, the machine readable medium 304 stores the program instructions corresponding to control access of the secure storage 116. In some examples, an administrator of the host computing system 102 may access the BMC 104 via an external computing system 126 of the host computing system 102 and update the security policy of the secure storage 116. The security policy includes access control rules. For example, a plurality of access control rules may be defined for accessing data from the secure storage 116. For example, access to BMC 104 and secure storage 116 may be based on FIPS validated 2-factor authentication.

FIG. 4 is a flow diagram depicting a method 400 of virtualizing a secure storage in the BMC 104 to the host computing system 102, in accordance with embodiments of the present disclosure. It should be noted herein that the method 400 is described in conjunction with FIGS. 1 and 2.

The method 400 starts at block 402 and continues to block 404. At block 404, the processor 106 emulates the secure storage 116 as a mass storage device to the host computing system 102. The processor 106 of the BMC 104 presents the secure storage 116 as a virtual drive to the host computing system 102.

Once the secure storage 116 is virtualized to the host computing system 102, the host computing system 102 may send a request for data from the secure storage 116. The request for data may be received from an application requiring specific configuration files 118 files stored in the secure storage 116 of the BMC 104. In an example, an application container may require the configuration files 118 stored in the secure storage 116 to run on the host computing system 102.

To ensure the integrity of the configuration files 118 stored in the BMC 104, the BMC 104 may monitor the secure storage 116 for changes. At block 406, the BMC 104 monitors the configuration files 118 in the secure storage 116 at regular intervals to detect changes.

At block 408, the BMC 104 determines if there is a change in a configuration files stored in the secure storage 116. A current hash of each configuration file may be compared with a hash of corresponding configuration file stored in the BMC 104. The BMC 104 may include a register with hash values of the configuration files 118. When the current hash of the configuration file matches the corresponding hash value stored in the BMC 104, it can be confirmed that there has been no changes to the files in the secure storage 116.

At block 410, the BMC 104 performs a security action in the host computing system 102 when a change in a configuration file is detected. When a current hash of the configuration file does not match the hash stored in a register of the BMC 104, there may changes in the configuration files 118. This indicates that the configuration files 118 in the secure storage 116 may have been changed and the host computing device may be compromised.

The security policy set for the access of the secure storage 118 may define the security action to be performed. In an example, the BMC 104 may report the change to a central management device in the data center along with log information from the BMC 104 and quarantine the host computing system 102. In some cases, the BMC 104 shut down the system and/or each interface to the system. In addition, access to the secure storage 116 may be locked until the host computing system 102 is investigated. Method 400 stops at block 412.

FIG. 5 is a flow diagram depicting a method 500 of updating the secure storage 116 in the BMC 104, in accordance with embodiments of the present disclosure. It should be noted herein that the method 500 is described in conjunction with FIG. 1.

In one example, conventional software updates may be pushed to, or downloaded by, computing devices do not include updates to configuration settings of the computing device. If configuration settings are updated in the host computing system 102, there may be incompatibility between the current version of the configuration settings and the new (updated) version of the configuration settings (e.g., if the computing device has been turned off for an extended period of time, the device may have skipped an update version of the configuration settings). Furthermore, third party applications may attempt to download malicious code in the form of configuration data. Hence, the configuration files 118 need to be protected from malicious codes and unauthorized changes. The method 500 described below the steps taken to protect the secure storage 116 containing the configuration files 118 and perform safe updates of the configuration files 118.

The method 500 starts at block 502 and continues to block 504. At block 504, the BMC 104 receives a notification that an update to a configuration file of an application is pending. To perform the update, the BMC 104 is connected to the external computing system 126 using out of band communication channel of the BMC 104. For example, the BMC 104 may communicate with the external computing device 126 may be connected via Remote Management Control Protocol (RMCP) for Intelligent Platform Management Interface (IPMI) over LAN. In some cases, the administrator or an authorized user may connect to the BMC 104 using the external computing system 126 to approve the update.

In addition, the secure storage 116 may have configuration files that are updated based on version counter which is verified before update of the configuration files 118 in the secure storage 116. The host computing system 102 may maintain a version counter to store the current version of the application in the BMC 104 and compare with the version of the update before allowing update of the application. For example, the version counter of a protected computer application may be compared to an expected version counter provided by the supplier of the update. In many cases, attacker may incorporate malware in an older version and present it as an update. The use of version counter comparison ensures that no such updates are performed.

At block 506, the BMC 104 updates the content of the secure storage 116. In another example, the configuration files present in the secure storage 116 may be updated via the external computing system 126. In an embodiment, the BMC 104 may evaluate a current state of the host computing system 102 before updating the content of the secure storage 116. The BMC 104 may verify that the host computing system 102 is in a known state before updating any configuration files stored in the secure storage 116. The known state may be confirmed by comparing the hash of the current configuration of the OS 124 with a known hash of a desired (intended) configuration of the OS 124 of the host computing system 102. If the hashes do not match, then it may be concluded that the host computing system 102 is not at the desired configuration.

At block 508, once the content of the secure storage 116 is updated, the administrator sets an access policy for the secure storage 116. In an example, the access policy to certain configuration files may be limited by the number of times a request to update is received. In another embodiment, any update to generic configuration files may be allowed. For example, time-zone information or settings may have an open access policy and be updated automatically.

It must be understood that access policy may be set individually for different configuration files 118. Further, the configuration files 118 of the host OS 124 to be stored in the secure storage 116 may be decided by the administrator using the external computing device 126. Method 500 stops at block 510.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A system comprising:
    a baseboard management controller (BMC) to communicate with a host computing device through a communication link, the BMC comprising a processor and a machine-readable storage medium storing instructions executable on the processor to:
        emulate, by the BMC, a secure storage storing a plurality of configuration files as an emulated storage device to the host computing device through the communication link;
        monitor the plurality of configuration files in the secure storage to detect changes in the configuration files;
        initiate a security action in the host computing device in response to detecting an unauthorized change in a configuration file of the plurality of configuration files;
        receive, at the BMC, a request to update a first configuration file of the plurality of configuration files in the secure storage, wherein the first configuration file is associated with an application;
        check version information, stored in the BMC, of the application to determine whether the version information matches expected version information of the application; and
        determine to allow the update of the first configuration file specified by the request based on the version information stored in the BMC matching the expected version information.

2. The system of claim 1, wherein the machine-readable storage medium comprises instructions executable on the processor of the BMC to:
    compare a computed hash of each corresponding configuration file present in the secure storage with a stored hash for the corresponding configuration file stored in the BMC to detect an unauthorized change in the corresponding configuration file.

3. The system of claim 1, wherein the plurality of configuration files are associated with application containers of the host computing device.

4. The system of claim 1, wherein the machine-readable storage medium comprises instructions executable on the processor of the BMC to:
    control access to the secure storage based on a security policy related to the secure storage and a current state of the host computing device.

5. The system of claim 1, wherein the version information of the application is stored in the secure storage, and the version information is provided by a version counter associated with the application.

6. The system of claim 5, wherein the version counter is in the BMC, and wherein the expected version information is from a supplier of the update of the first configuration file.

7. The system of claim 1, wherein the secure storage is a Non-Volatile Random Access Memory (NVRAM) drive in the BMC.

8. The system of claim 1, wherein the instructions are executable on the processor of the BMC to further:
in response to the request, check a current state of the host computing device, wherein the determination to allow the update of the first configuration file specified by the request is further based on the current state of the host computing device being at a target state.

9. A method comprising:
emulating, by a baseboard management controller (BMC) to a host computing device through a communication link, a secure storage storing a plurality of configuration files as an emulated storage device;
monitoring, by the BMC, the plurality of configuration files in the secure storage to detect changes in the configuration files;
in response to detecting an unauthorized change in a configuration file of the plurality of configuration files, initiating a security action in the host computing device;
receiving, at the BMC, a request to update a first configuration file of the plurality of configuration files in the secure storage, wherein the first configuration file is associated with an application;
checking version information, stored in the BMC, of the application to determine whether the version information matches expected version information of the application; and
determining, by the BMC, to allow the update of the first configuration file specified by the request based on the version information stored in the BMC matching the expected version information.

10. The method of claim 9, wherein the detecting of the unauthorized change in the configuration file comprises:
comparing a computed hash of the configuration file present in the secure storage with a stored hash of the configuration file stored in the BMC.

11. The method of claim 9, wherein the plurality of configuration files are associated with application containers of the host computing device.

12. The method of claim 9, further comprising:
receiving, by the BMC, a request for data in the secure storage from the host computing device; and
in response to receiving the request, transferring, by the BMC, requested data from the secure storage to the host computing device.

13. The method of claim 9, wherein the version information of the application is provided by a version counter associated with the application.

14. The method of claim 13, wherein the version counter is in the BMC, and wherein the expected version information is from a supplier of the update of the first configuration file.

15. A non-transitory machine readable machine-readable medium storing instructions executable by a processing resource of a baseboard management controller (BMC) to:
emulate a secure storage storing a plurality of configuration files as an emulated storage device to a host computing device through a communication link;
monitor the plurality of configuration files in the secure storage to detect changes in the plurality of configuration files;
initiate a security action in the host computing device in response to detecting an unauthorized change in a configuration file of the plurality of configuration files;
receive, at the BMC, a request to update a first configuration file of the plurality of configuration files in the secure storage, wherein the first configuration file is associated with an application;
check version information, stored in the BMC, of the application to determine whether the version information matches expected version information of the application; and
determine, at the BMC, to allow the update of the first configuration file specified by the request based on the version information stored in the BMC matching the expected version information.

16. The non-transitory machine-readable medium of claim 15, wherein the plurality of configuration files are associated with application containers of the host computing device.

17. The non-transitory machine-readable medium of claim 15, wherein the version information of the application is stored in the secure storage, and the version information is provided by a version counter associated with the application.

18. The non-transitory machine-readable medium of claim 17, wherein the version counter is in the BMC, and wherein the expected version information is from a supplier of the update of the first configuration file.

19. The non-transitory machine-readable medium of claim 15, wherein the plurality of configuration files are updated using an out of band communication channel of the BMC.

20. The non-transitory machine-readable medium of claim 15, wherein the instructions are executable by the processing resource of the BMC to:
receive, at the BMC, a request for data in the secure storage from the host computing device; and
transfer requested data from the secure storage to the host computing device in response to receiving the request.

* * * * *